United States Patent
Stefanovic

(10) Patent No.: US 9,589,356 B2
(45) Date of Patent: *Mar. 7, 2017

(54) METHOD AND SYSTEM FOR DETERMINING A NUMBER OF TRANSFER OBJECTS WHICH MOVE WITHIN AN OBSERVED REGION

(71) Applicant: HELLA KGAA HUECK & CO., Lippstadt (DE)

(72) Inventor: Marko Stefanovic, Berlin (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 3 days.

This patent is subject to a terminal disclaimer.

(21) Appl. No.: 14/971,257

(22) Filed: Dec. 16, 2015

(65) Prior Publication Data

US 2016/0098830 A1    Apr. 7, 2016

Related U.S. Application Data

(63) Continuation of application No. 13/983,846, filed as application No. PCT/EP2012/052765 on Feb. 17, 2012, now Pat. No. 9,245,340.

(30) Foreign Application Priority Data

Feb. 18, 2011  (DE) .................. 10 2011 011 930

(51) Int. Cl.
G06K 9/00   (2006.01)
G06T 7/00   (2006.01)
(Continued)

(52) U.S. Cl.
CPC .......... *G06T 7/004* (2013.01); *G06K 9/00778* (2013.01); *G06T 7/2033* (2013.01);
(Continued)

(58) Field of Classification Search
None
See application file for complete search history.

(56) References Cited

U.S. PATENT DOCUMENTS 3,805,028 A    4/1974 Morton
3,900,718 A    8/1975 Seward
(Continued)

FOREIGN PATENT DOCUMENTS

DE    2065764 A1    7/1976
DE    202006007875 U1   9/2007
(Continued)

OTHER PUBLICATIONS

Kazuhiro Otsuka, Naoki Mukawa, "Multiview Occlusion Analysis for Tracking Densely Populated Objects Based on 2-D Visual Angles," Computer Vision and Pattern Recognition, IEEE Computer Society Conference on, vol. 1, pp. 90-97, 2004 IEEE Computer Society Conference on Computer Vision and Pattern Recognition (CVPR'04)—vol. 1, 2004.*

(Continued)

*Primary Examiner* — Tahmina Ansari
(74) *Attorney, Agent, or Firm* — Timothy X. Gibson, Esq.; Gibson & Dernier LLP

(57) ABSTRACT

The invention proposes a method for determining a number (13) of transfer objects which are moving from a first subregion (8) of an observed region (5) into a second subregion (9) of the observed region (5), wherein a succession of images of the observed region (5) is recorded which identify objects (1; 2; 3; 4) and determine positions (1b, 1c; 2a, 2b, 2c; 3a, 3b, 3c; 4a, 4b) for the objects (1; 2; 3; 4), respectively, the objects (1; 2; 3; 4) are each associated either with the first subregion (8) or with the second subregion (9) on the basis of the positions (1b, 1c; 2a, 2b, 2c; 3a, 3b, 3c; 4a, 4b) of said objects, and multiple transfers of the same object between the first subregion (8) and the second subregion (Continued)

region (9) are taken into account when determining the number (13) of transfer objects. The invention likewise proposes an appropriate system which can be used to carry out the method, said system comprising a sensor arrangement and a computation unit connected to the sensor arrangement.

10 Claims, 4 Drawing Sheets

(51) Int. Cl.
 *G06T 7/20* (2006.01)
 *G08B 13/196* (2006.01)
 *H04N 7/18* (2006.01)
(52) U.S. Cl.
 CPC ....... *G08B 13/19608* (2013.01); *H04N 7/183* (2013.01); *G06T 2207/10016* (2013.01); *G06T 2207/30196* (2013.01); *G06T 2207/30232* (2013.01); *G06T 2207/30241* (2013.01); *G06T 2207/30242* (2013.01)

(56) References Cited

U.S. PATENT DOCUMENTS

| | | | |
|---|---|---|---|
| 7,878,391 | B2 | 2/2011 | Kalkhoff |
| 2007/0098253 | A1* | 5/2007 | Crespi ................ G06K 9/00778 |
| | | | 382/159 |
| 2007/0278284 | A1 | 12/2007 | Kalkhoff |
| 2008/0118106 | A1* | 5/2008 | Kilambi ................ G06M 11/00 |
| | | | 382/103 |
| 2014/0023233 | A1* | 1/2014 | Stefanovic ............ G06T 7/2033 |
| | | | 382/103 |

FOREIGN PATENT DOCUMENTS

| | | |
|---|---|---|
| DE | 102007041333 A1 | 3/2009 |
| JP | 2007287094 A | 11/2007 |
| JP | 2009199109 A | 9/2009 |

OTHER PUBLICATIONS

International Search Report for corresponding PCT Application No. PCT/EP20121052765, dated May 29, 2012.
Septian H et al; "People Counting by 1-6, 9-11 Video Segmentation and Tracking" Control, Automation, Robotics and Vision, 4 pages, ICARCV '06. 9th International Conference on (Dec. 1, 2006).
Kazuhiro Otsuka, Naoki Mukawa, "Multiview Occlusion Analysis for Tracking Densely Populated Objects Based on 2-D Visual Angles," Computer Vision and Pattern Recognition, IEEE Computer Society Conference on, vol. 1, pp. 90-97, 2004 IEEE Computer Society Conference on Computer Vision and Pattern Recognition 8 Pages, (CVPR'04)—vol. 1, 2004.
Office Action for corresponding U.S. Appl. No. 13/983,846, 25 pages, dated May 20, 2015.

* cited by examiner

METHOD AND SYSTEM FOR DETERMINING A NUMBER OF TRANSFER OBJECTS WHICH MOVE WITHIN AN OBSERVED REGION

CROSS-REFERENCE TO RELATED APPLICATIONS

This application is a continuation of U.S. patent application Ser. No. 13/983,846 filed Oct. 10, 2013, which is the National Stage of International Application No. PCT/EP2012/052765 filed Feb. 17, 2012.

BACKGROUND

The invention relates to a method and a system for determining a number of transfer objects which move from a first sub-region of an observed region into a second sub-region of the observed region.

In many fields of technology and daily life, great importance is attached to the counting of movable objects. For example, a storeowner is interested to know how many visitors visit his store within a given period of time.

In the counting methods known from the prior art for applications of this type and similar applications, systems that comprise a video camera connected to an image analysis unit are used as a counting device. A system of this type is designed to observe a region, for example the entry region of a shop or means of transport, to recognise and localise objects moving in the region, and to trigger a counting event when one of the objects crosses a predefined boundary running in the region, for example a door threshold, which runs in the region and divides it.

These known methods have the disadvantage however that objects which move to and fro within the observed region and pass the boundary a number of times in so doing trigger a counting event each time they pass the boundary. Objects that display such behaviour are also referred to as re-entrants. These can falsify a result of the count considerably.

SUMMARY OF THE INVENTION

The object of the present invention is therefore to develop a method and a system with the aid of which movable objects can be counted as reliably as possible no matter how the objects move.

A method for determining a number of transfer objects which move from a first sub-region of an observed region into a second sub-region of the observed region is described, wherein
- a sequence of images of the observed region is recorded, in which objects are identified and positions of the objects are determined,
- the objects, depending on their positions, are associated with either the first or the second sub-region, and
- multiple transfers of the same object between the first sub-region and the second sub-region are taken into account when determining the number of transfer objects.

With the aid of this method, it is possible to reliably determine the number of transfer objects. Since multiple transfers of the same object between the first sub-region and the second sub-region are taken into account when determining the number of transfer objects, errors such as those that occur with counting methods according to the prior art when re-entrants are counted a number of times can be corrected effectively.

The sequence of images of the observed region can be recorded using a sensor arrangement that preferably comprises an optical sensor. The optical sensor can be formed as a simple photo camera, as a CCD camera, as a stereo camera, as a video camera, as a streak camera or as a time-of-flight camera. The recording is characterised by an exposure time and by an image repetition rate. Here, the image repetition rate indicates how many images are recorded in a given period of time. When recording images using a sensor arrangement, the observed region is the region that is observed by the sensor arrangement. Typically, the observed region is three-dimensional and contiguous. The first sub-region and the second sub-region of the observed region are preferably selected in such a way that the observed region is a disjunct combination of the first sub-region and the second sub-region. Here, the first sub-region and the second sub-region may also be contiguous. The first sub-region and the second sub-region are separated by a boundary. In a period of observation, which is given by the recording of the sequence of images, the objects move in the observed region. A number of objects identified in the images may be subject to changes. Objects may constantly leave the observed region and re-enter it. The exposure time and the image repetition rate are preferably adapted to the speeds at which the objects move in the observed region. To this end, the exposure time may be selected in such a way that a first path covered by an object within the exposure time is less than a first threshold value. The image repetition rate can also be selected in such a way that a second path covered by an object between the recording of two successive images is less than a second threshold value.

A transfer of an object between the first sub-region and the second sub-region is either a transfer of the object from the first sub-region into the second sub-region or a transfer of the object from the second sub-region into the first sub-region. Between the recording of a first image and a second image, a transfer of an object from the first sub-region into the second sub-region has taken place if the object is associated in the first image with the first sub-region and if the object is associated in the second image with the second sub-region. A transfer of an object from the second sub-region into the first sub-region is defined in a similar manner. A multiple transfer of the same object is then present if this object moves in the sequence of images at least once from the first sub-region into the second sub-region and back again from the second sub-region into the first sub-region. A multiple transfer of the same object is then also present if this object moves in the sequence of images at least once from the second sub-region into the first sub-region and back again from the first sub-region into the second sub-region. A multiple transfer of the same object is thus then present if this object passes the boundary between the first and the second sub-region at least twice. The consideration of the number of transfer objects comprises at least one check of the number. This may, but does not have to, involve a change of the number.

Within the meaning of the present invention, transfer objects are firstly objects that are associated in a first of the sequence of images with the first sub-region and which, at the end of the sequence of images or immediately before they leave the observed region, are associated with the second sub-region. Within the meaning of the present invention, transfer objects are additionally also objects which, in the sequence of images, enter the observed region from outside the observed region and which, in the observed region, are at first associated with the first sub-region and which, at the end of the sequence of images or immediately before they leave the observed region, are associated with the second sub-region. All other objects are not transfer objects within the meaning of the present invention. In other words, with the method and system described here, counting is only implemented in one direction—from the first sub-region into the second sub-region. Counting in an opposite direction—from the second sub-region into the first sub-region—can be easily carried out similarly to the counting method described here by swapping the first and the second sub-region. The system and method described here can thus also be used for simultaneous counting in both directions.

In an advantageous embodiment of the invention, the identification of the objects in the images comprises a segmentation of the images. The segmentation comprises a combining of individual image pixels of the images to form segments. Segmentation can be performed on the basis of grey-scale values of the image pixels. A segment preferably corresponds to an identified object. The position of an identified object can be selected for example as a centre point of a segment. An image background can be taken into account during the segmentation process.

In a further advantageous embodiment of the invention, a track is associated with each of the objects and is determined from positions of the object in the sequence of images, wherein the track has a starting position located either in the first or in the second sub-region. The track thus comprises positions of the same object in successive images. A track may also comprise just one single current position of the object. Two positions determined in successive images are then preferably associated with the same track if they are adjacent. This means that a spacing between the two positions is smaller than a maximum spacing. With regard to the association, a multiplicity of more than two successive positions can also be taken into account however. The movement of an object in the sequence of images can thus be followed reliably.

The track of an object then ends when the object leaves the observed region. The starting position may be the position of an object that is identified for the first time after an entry into the observed region. The starting position can also be the position of an object identified in a first image. The starting position can also be the position of an object that has left the observed region in the meantime and has then re-entered the observed region. When the object leaves the observed region, the track can be either deleted or can remain stored. Since a track is associated with each of the objects, it is possible to follow the movement of the objects in the sequence of images.

In a further advantageous embodiment of the invention, a memory state is associated with each of the objects on the basis of its track and, with a given starting position of the track, is dependent on whether the respective object is associated with the first or the second sub-region. The memory state is preferably initialised with a predefined value when the respective object is identified for the first time. The memory state of an object comprises additional information concerning the movement thereof in the observed region. The memory state of an object preferably remains stored when this object leaves the observed region.

In a further advantageous embodiment of the invention, the determination of the number of transfer objects comprises an updating of the number after a transfer of one of the objects between the first and the second sub-region, wherein the update is performed in accordance with the memory state of the respective object and in accordance with a direction of the transfer of the respective object. Here, the update may comprise the fact that the number of transfer objects is incremented, that the number of transfer objects is decremented, or that the number of transfer objects is not changed. The number of transfer objects when the recording of the sequence of images is begun is preferably initialised with a starting value. Here, the direction of the transfer of the respective object denotes whether the respective object has transferred from the first sub-region into the second sub-region or whether the respective object has transferred from the second sub-region into the first sub-region. The current memory state is preferably always established before the number of transfer objects is updated. The number of transfer objects is thus updated once one or more of the objects has/have passed the boundary between the first sub-region and the second sub-region. The execution of the updating process in accordance with the memory state and the direction of the transfer of the respective object makes it possible to identify the presence of a multiple transfer of said object.

In a further advantageous embodiment of the invention, the memory state is a first memory state when the starting position of the track of the respective object and the current position of the respective object are each located in different sub-regions, and the memory state is a second memory state when the starting position of the respective object and the current position of the respective object are located in the same sub-region. The memory state of an object therefore changes when the object passes the boundary between the first sub-region and the second sub-region. The memory state of an object does not change provided the object remains in the same sub-region.

In a further advantageous embodiment of the invention, the memory state is a number that is incremented by a first value each time the respective object transfers between the first and the second sub-region, wherein the first memory state is present when the number is an odd multiple of the first value, and wherein the second memory state is present when the number is an even multiple of the first value. From the memory state of an object, it is thus possible to establish how often the respective object has crossed the boundary between the first and the second sub-region. It is advantageous if the number in the event of a first identification of the respective object is initialised with a starting value. It is expedient to select 0 as a starting value. If, in this case, the first value is set equal to 1, the memory state of the respective object thus immediately indicates how often the respective object has passed the boundary between the first and the second sub-region.

In a further advantageous embodiment of the invention, the number of transfer objects is updated in such a way that the number of transfer objects is incremented by a second value when the respective object transfers from the first into the second sub-region and the memory state of the respective object is the first memory state, and in such a way that the number of transfer objects is decremented by the second value when the respective object transfers from the second into the first sub-region and the memory state of the respective object is the second memory state. In this case too, the memory state of the respective object is advantageously established first, and only then is the number of transfer objects updated.

It is particularly advantageous if an increment variable and a decrement variable are associated with each identified object and are stored. The increment variable is incremented by the second value when the number of transfer objects is incremented by the second value after a transfer of the respective object. Similarly, the decrement variable is decremented by the second value when the number of transfer objects is decremented by the second value after a transfer of the respective object. The values of the increment variable and of the decrement variable of the respective object also then preferably remain stored when the object leaves the observed region. In this way, a number of re-entrants can be documented and understood. This may be of practical significance, for example when the observed region is an entry and exit region of successive escalators, as can be found typically in department stores. In this case, the first region may be a path covered by escalators, said path comprising a first escalator between a first and a second level and a second escalator between the second and a third level, and the second region may be part of the second level of the store. A person who, coming from the first escalator, that is to say from the first sub-region, briefly enters the second level, that is to say the second sub-region, and then steps onto the second escalator and therefore re-enters the first sub-region does not contribute on the whole to a change of the number of transfer objects—in the example these are visitors to the second level. The increment variable and the decrement variable are designed such that this short visit to the second level remains documented however.

In a further specific embodiment, an object, preferably each object, that transfers or is transferred at least once from the first sub-region into the second sub-region or that transfers or is transferred at least once from the second sub-region into the first sub-region is marked as an entrant and/or as a leaver, wherein the object

- is marked as an entrant if its starting position is located in the first sub-region,
- is marked as a leaver if its starting position is located in the second sub-region, and
- is marked both as an entrant and as a leaver if the memory state of the object is the second memory state.

The marking may comprise an association of an entrant attribute and/or a leaver attribute. For example, an entrant variable and/or a leaver variable, which may each adopt precisely two different values, that is to say a starting value and an end value, can be associated with each identified object. Here, the starting value may be zero and the end value may be one. However, non-numerical values are also conceivable. The entrant variable and the leaver variable are preferably each initialised with the starting value when the object is identified for the first time. If the entrant variable is set to the starting value, the corresponding object is therefore not marked as an entrant. Equally, the object is not marked as a leaver if the leaver variable of the object is set to the starting value. By setting the entrant variable to the end value, the corresponding object can be marked as an entrant. Similarly, the object can be marked as a leaver by setting the leaver variable to the end value. The values of the entrant variable and of the leaver variable preferably remain stored when the object leaves the observed region. Other embodiments of the marking process are also conceivable. It is key that the marking process is performed or implemented in such a way that it is possible to determine at any moment for an identified object, preferably for each identified object, whether or not this object is marked as an entrant and/or whether or not this object is marked as a leaver. The marking of an object is preferably checked immediately after each transfer of the object between the sub-regions and is updated where appropriate.

By counting the objects marked in this way as entrants and/or as leavers, an entrant number and/or a leaver number can preferably be determined at any moment, wherein the entrant number is then equal to the number of objects marked as entrants, and/or wherein the leaver number is then equal to the number of objects marked as leavers. Further information concerning the objects that remains unconsidered in the previously described embodiments can thus be obtained. For example, the determination of the entrant number and/or of the leaver number can be used when counting customers in a department store in which a sales stand is located in the door region, wherein the door threshold is to be the boundary between the first and the second sub-region, and wherein the stand is to be located in the second sub-region. It is conceivable in this case for a customer coming from outside to cross the door threshold, that is to say to move from the first sub-region via the boundary into the second sub-region, to speak with an advisor at the sales stand and to then move back into the first sub-region and leave the department store. This customer is identified as a re-entrant and consequently is not counted as a transfer object. When counting the objects marked as entrants and/or as leavers, this customer is taken into account however.

A system for determining a number of transfer objects which move from a first sub-region of an observed region into a second sub-region of the observed region comprises at least one sensor arrangement and a computation unit connected to the sensor arrangement, wherein the sensor arrangement is designed to record a sequence of images of the observed region, and wherein the computation unit is programmed.

- to identify objects in the images and to determine positions of the objects,
- to associate each of the objects, in accordance with their positions, either with the first or the second sub-region, and
- to take into account multiple transfers of the same object between the first sub-region and the second sub-region when determining the number of transfer objects.

BRIEF DESCRIPTION OF THE DRAWINGS

Exemplary embodiments of the invention are illustrated in the following drawings and will be explained in greater detail in the following description. In the drawings

DETAILED DESCRIPTION OF THE INVENTION

Figure 1:
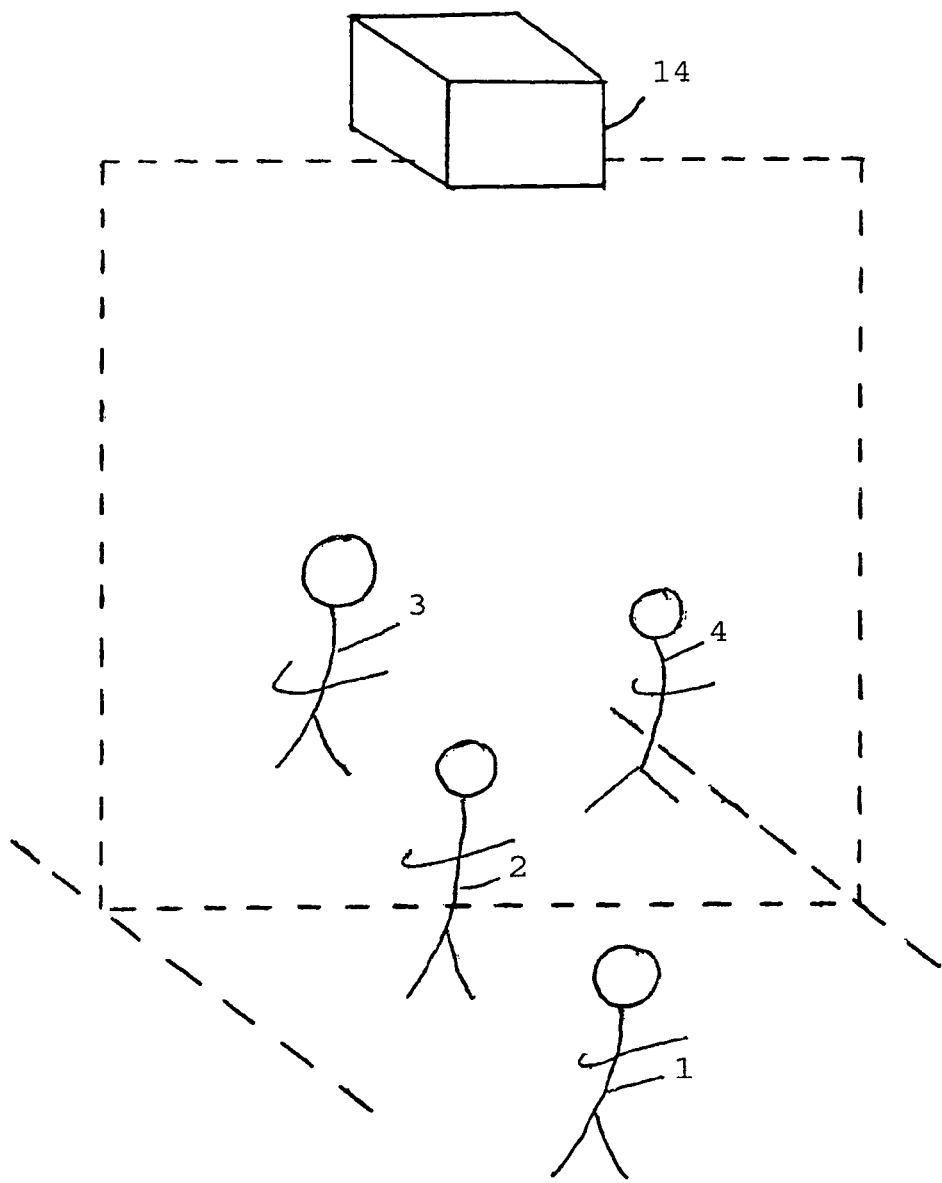
FIG. 1 shows a schematic view of an entry region of a building, in which people are moving, observed by a sensor arrangement.

FIG. 1 shows a schematic view of an entry region of a building, which for example is a department store. A sensor arrangement 14 can be seen and is designed to observe the entry region. In the present exemplary embodiment, the sensor arrangement 14 is formed as an individual video camera. A photo camera, a stereo camera, a streak camera or a time-of-flight camera can also be used as a sensor arrangement 14. The sensor arrangement 14 may also comprise a combination of a plurality of identical or different sensors. These are preferably optical sensors here. A computation unit which is arranged in the sensor arrangement 14 and is connected to the sensor arrangement 14 cannot be seen. Individuals, that is to say the objects 1, 2, 3 and 4, move in the entry region. The sensor arrangement 14 is designed to record a sequence of images of the entry region. The objects 1, 2, 3 and 4 move in the entry region typically at a speed of approximately 1 m/s. An exposure time and an image recording rate of the sensor arrangement 14 are adapted to this speed. The image recording rate of the sensor arrangement 14 is thus approximately 20 Hz, and the exposure time of an individual image of the sequence of images is 40 ms.

Figure 2:
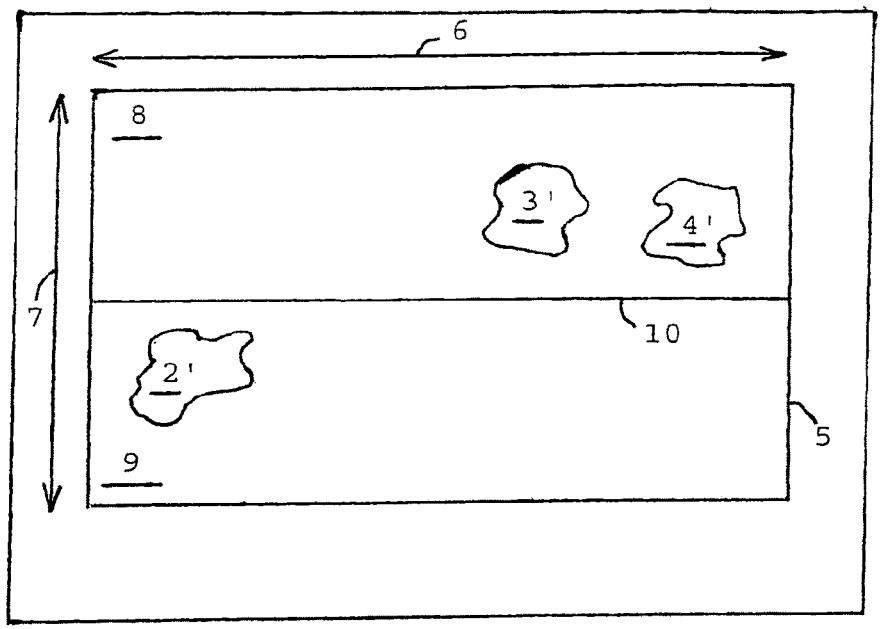
FIG. 2 shows a schematic view of a first recording of the entry region from FIG. 1, wherein the recording has already been subject to segmentation.

FIG. 2 shows a first of the sequence of images, which illustrates an observed region 5. The observed region 5 has a rectangular shape with a length 6 of approximately 5 m and a width 7 of approximately 3 m. A boundary 10 runs through the observed region and divides it into a first sub-region 8 and a second sub-region 9. The boundary 10 for example reproduces the course of a door threshold in the entry region. In the first image shown in FIG. 2, which is also to be called a first recording, the image recorded by the sensor arrangement 14 has already been segmented. Segments 2', 3' and 4' obtained from the segmentation are illustrated. The segments 2', 3' and 4' correspond to the objects 2, 3 and 4 respectively, shown in FIG. 1. By means of this segmentation, the objects 2, 3 and 4 in the observed region 5 have each been identified. The object 1 shown in FIG. 1 is located outside the observed region 5 and has therefore not been identified in FIG. 2. Recurring features are provided with the same reference signs in the following figures.

FIG. 3 again shows the first recording of the sequence of images illustrated already in FIG. 2, wherein the computation unit has determined from the segments 2', 3' and 4', with the aid of which the objects 2, 3 and 4 have been identified, positions 2a, 3a and 4a of the objects 2, 3 and 4. An identification of objects by means of segmentation and a subsequent determination of positions of the respective objects from the segments are achieved in a similar manner in each of the sequence of images, these processes being carried out in each case by the computation unit. In each of FIGS. 3 to 5, only positions of objects are shown. These are in each case representative for the objects associated with the positions.

The computation unit is designed to associate the objects 2, 3 and 4, in each case in accordance with their respective positions 2a, 3a and 4a, either with the first sub-region 8 or the second sub-region 9. The objects 3a and 4a are thus associated with the first sub-region 8 in FIG. 3. The object 2a is associated with the second sub-region 9. Hereinafter, a determination of a number of transfer objects which move from the first sub-region 8 of the observed region 5 into the second sub-region 9 of the observed region 5 will be described.

Figure 3:
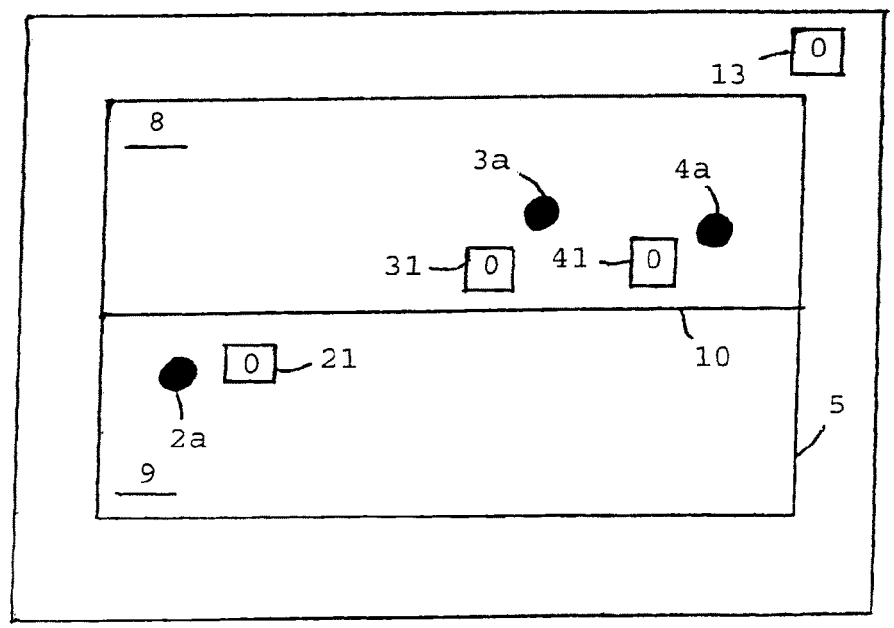
FIG. 3 shows the first recording, wherein, after segmentation, positions of some individuals from FIG. 1 have been determined.

In FIG. 3, a track is associated with each of the objects associated with the positions 2a, 3a and 4a and is determined from positions of the respective object in the sequence of images. In the first image illustrated in FIG. 3, the tracks of the objects 2, 3 and 4 are identical to the positions 2a, 3a and 4a respectively. In the first image shown in FIG. 3, each of the tracks thus comprises just one position.

Here, each of the positions 2a, 3a and 4a in FIG. 3 is also a starting position of the respective track.

In FIG. 3, a number 21, which is initialised with 0, is additionally associated with the object 2 having the position 2a. Accordingly, numbers 31 and 41, which are likewise each initialised with 0, are associated with the objects 3 and 4 having the positions 3a and 4a respectively. A value of the number 21 is intended to indicate how often the corresponding object 2 has passed the boundary 10 between the first sub-region 8 and the second sub-region 9. The numbers 31 and 41 with regard to the objects 3 and 4 have a similar meaning. The numbers 21, 31 and 41 constitute a memory state of the objects 2, 3 and 4 respectively. A number 13 of the transfer objects is initialised with 0 in the first recording of the sequence of images illustrated in FIG. 3. This means that none of the identified objects 2, 3 and 4 has yet been recognised as a transfer object in the first recording.

Figure 4:
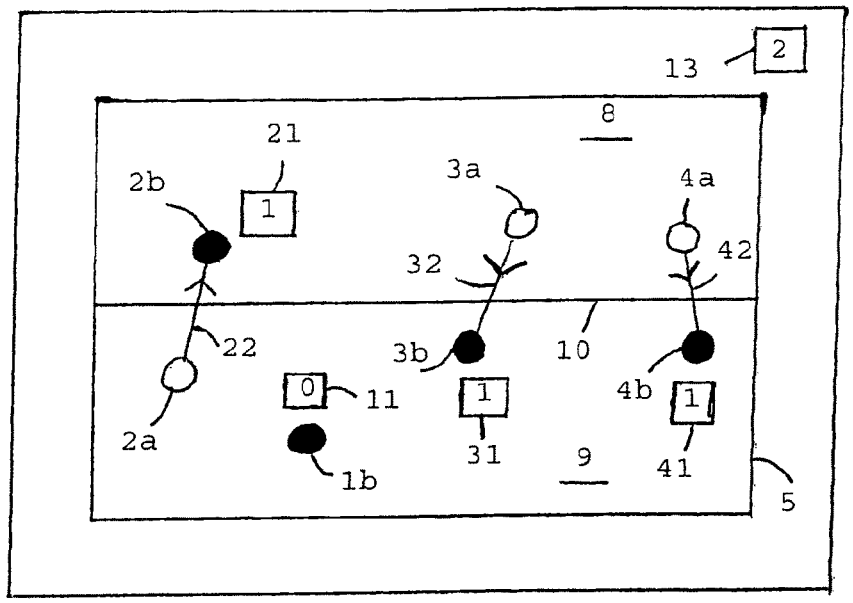
FIG. 4 shows a schematic view of a second recording of the entry region with positions and tracks of identified individuals.

FIG. 4 shows a second image of the sequence of images, which will also be referred to as a second recording and has been recorded chronologically after the first image shown in FIG. 3. In the second recording, segmentation has already been carried out and current positions 1b, 2b, 3b and 4b of the objects 1, 2, 3 and 4 have already been determined, wherein the current positions are each illustrated as black dots. Between the first recording shown in FIG. 3 and the second recording shown in FIG. 4, the object 2 has moved from the position 2a, which is located in the second sub-region 9, to the current position 2b, which is located in the first sub-region 8. A track 22, which comprises the position 2a of the object 2 as a starting position and also the current position 2b of the object 2, is associated in FIG. 4 with the object 2 having the position 2b.

Between the first and the second recording, the object 2 has transferred from the second sub-region 9 into the first sub-region 8. After this transfer of the object 2, the number 21 associated with the object 2, this number representing the memory state of the object 2, is incremented by a first value. Here, the first value is equal to 1. In FIG. 4, the value of the number 21 associated with the object 2 is therefore 1. The memory state of the object 2 in FIG. 4 is therefore a first memory state, which is characterised in that the number 21 is an odd multiple of the first value 1. In other words, p mod 2=1 is true for the number 21 in the first memory state, wherein "p" assumes the value of the number in the first memory state, and wherein "mod" is the modulo operator. The first memory state of the object 2 in FIG. 4 is also characterised in that the current position 2b of the object 2 and the starting position 2a of the track 22 of the object 2 are each located in different sub-regions. In other words, the first memory state is then present if the respective object has passed the boundary 10 an odd number of times.

Once the object 2 has passed the boundary 10 and the number 21 associated therewith has been incremented by 1, the number 13 of transfer objects is updated, specifically in accordance with the memory state of the object 2 and in accordance with a direction in which the object 2 has passed the boundary 10. In the case of the object 2, which in FIG. 4 is in the first memory state and has passed the boundary 10 in the direction from the second sub-region into the first sub-region, the update includes the fact that the number 13 is not changed.

The object 1, with which the current position 1b is associated in FIG. 4, was identified for the first time in FIG. 4. A track can also be associated with this object, said track comprising just the current position 1b itself however. A number 12, which is initialised with 0 and is a memory state of the object 1, is additionally associated with the object 1.

In FIG. 4, the current position 3b is associated with the object 3. A track 32 is additionally associated with the object 3 and comprises the current position 3b and a starting position 3a, wherein the latter is identical to the position 3a of the object 3 determined in the first recording. The number 31 associated with the object 3 is incremented by 1 once the object 3 has passed the boundary 10 and thus has the value 1 in FIG. 4.

In FIG. 4, the object 3 has transferred from the first sub-region 8 into the second sub-region 9. The number 31 associated with object 3 has the value 1 in FIG. 4 and thus represents a first memory state of the object 3. As a result of this transfer of the object 3 between the first and the second recording, the number 13 of transfer objects is therefore incremented by 1, wherein 1 is a second value. In FIG. 4, a situation of the object 4, with which a track 41 is likewise associated, is similar to the situation of the object 3. As a result of the transfer of the object 4 from the first sub-region 8 into the second sub-region 9, the number 13 of the transfer objects is therefore also incremented by 1. Once the number 13 of transfer objects has been updated for the objects 2, 3 and 4 which have been identified in FIG. 4 and which have each crossed the boundary 10 between the first and the second recording, the number 13 of transfer objects in FIG. 4 has the value 2. This is equivalent to the fact that, in the course of the first and the second recording, two objects, specifically the object 3 and the object 4, which were each identified at first in the first sub-region 8, have crossed over from the first sub-region 8 into the second sub-region 9.

Figure 5:
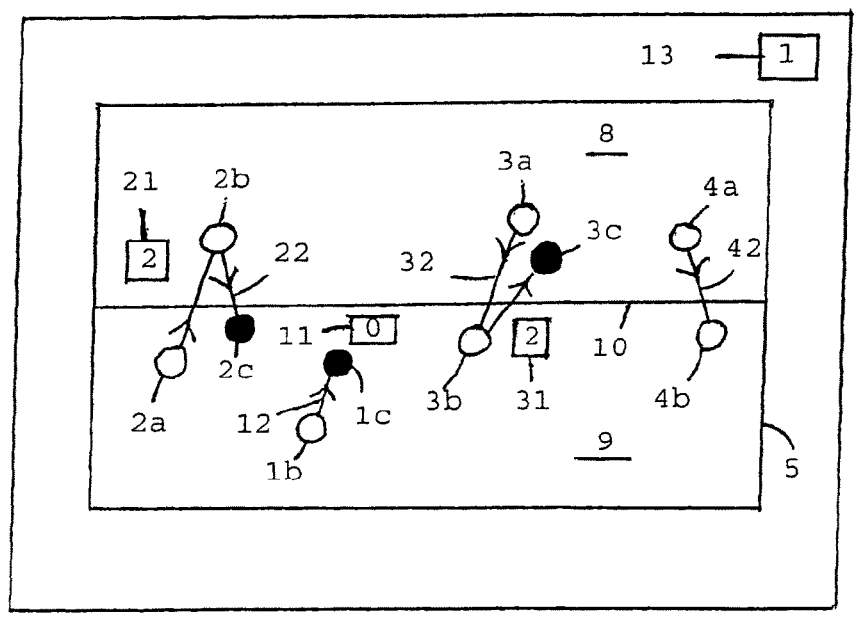
FIG. 5 shows a schematic view of a fourth recording of the entry region, likewise with positions and tracks of identified individuals.

FIG. 5 shows a third recording of the sequence of images. The objects 1, 2 and 3 have been identified by segmentation and the positions 1c, 2c and 3c thereof respectively have been determined. The object 2 has moved between the second and the third recording from the position 2b in the first sub-region 8 into the position 2c in the second sub-region 9. The track 22 associated with the object 2 therefore comprises the current position 2c of the object 2 and also the position 2b determined in the second recording and the position 2a determined in the first recording, which is a starting position of the track 22. The object 2 has thus crossed the boundary 10 again. The number 21 associated with the object 2 is therefore again incremented by 1 and now has the value 2 in FIG. 5. The number 21 therefore represents a second memory state of the object. This is characterised on the one hand in that the current position 2c of the object 2 and the starting position 2a of the track 22 of the object 2 are associated with the same sub-region, specifically the second sub-region 9 here. On the other hand, the second memory state of the object 2 is defined in that the number 21 has a value which is an even multiple of the first value. (The first value has the value 1 and the number 21 in FIG. 5 has the value 2). In other words, q mod 2=0 is true for the number 21 in the second memory state, wherein "q" assumes the value of the number in the second memory state, and wherein "mod" is the modulo operator, as before.

After the transfer of the object 2, the number 13 of transfer objects is updated. In the case of object 2 in FIG. 5, the update does not include a change to the number 13 however. The current position 2c and the starting position 2a of the track 22 of the object 2 are both located in the second sub-region 9. The object 2 in FIG. 5 is therefore a re-entrant and does not contribute to the number 13 of transfer objects. There is thus a multiple transfer of said object, specifically the object 2, between the first sub-region 8 and the second sub-region 9.

The object 1 has moved between the second recording and the third recording from the position 1b into the current position 1c. A track 12 associated with the object 1 therefore comprises the positions 1c and the position 1b, wherein the position 1b is a starting position of the track 12 of the object 1. The object 1 has not passed the boundary 10 between the first sub-region 8 and the second sub-region 9 between the second and the third recording. The number 11 associated with the object 1 is therefore not incremented and furthermore has the value 0. In FIG. 5, the number 13 is not updated for the object 1.

The object 3 between the second and the third recording has in turn moved from the position 3b located in the second sub-region 9 into the current position 3c, which is located in the first sub-region 8. The object 3 has thus passed from the second sub-region 9 into the first sub-region 8. As a result of this transfer of the object 3, the number 31 associated with the object 3 has in turn been incremented by 1 and now has the value 2. The memory state of the object 3 in FIG. 5 is therefore a second memory state. As a result of this transfer of the object 3 from the second sub-region into the first sub-region, the number 13 of transfer objects is therefore decremented by 1 and now has the value 1. Here, 1 is again the second value.

The object 4 has left the observed region 5 in FIG. 5 and is not identified. The object 4 in FIG. 5 therefore does not contribute to the updating of the number 13 of transfer objects. Once the number 13 of transfer objects in FIG. 5 has been updated for all objects identified in FIG. 5, the number 13 of transfer objects has the current value 1. It is clear from the track 22 of the object 2 and from the track 32 of the object 3 that the objects 2 and 3 are each re-entrants. In FIG. 5, the object 2 and the object 3 have therefore each transferred twice via the boundary 10 between the first sub-region 8 and the second sub-region 9. The objects 2 and 3 in FIG. 5 are therefore each multiple transfers of said objects, which have each been recognised. With the provisions described here for determining the number 13, multiple transfers of this type of the same object between the first sub-region 8 and the second sub-region 9 are taken into account.

Figure 6:
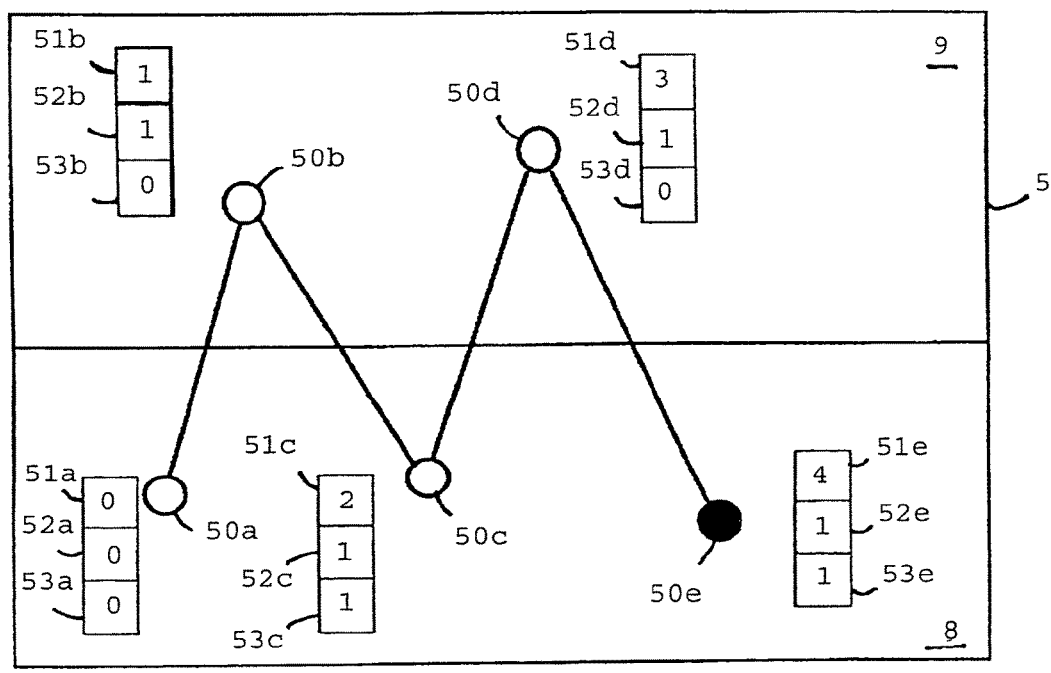
FIG. 6 shows a schematic view of a track of an individual in the entry region via a sequence of five recordings, wherein the individual is in each case marked as an entrant and/or as a leaver.

FIG. 6 shows a track of an object over a sequence of five images. Positions 50a-50e of the object in the individual images, by means of which the track is determined, are each indicated as circles. Recurring features are provided with identical reference signs, as before. In the exemplary embodiment described here, besides a memory state, which is given in the sequence of images by values 51a-51e and which represents the number of transfers of the object between the first sub-region 8 and the second sub-region 9 already carried out by the object in the respective image, an entrant variable and a leaver variable are additionally associated with the object. The entrant variable assumes values 52a-52e in the sequence of images. The values 52a-52e of the entrant variable here have the value 0 when the object is not marked in the respective image as an entrant, and the value 1 when the object is marked in the respective image as an entrant. Accordingly, the leaver variable in the sequence of images assumes values 53a-53e. The values 53a-53e of the leaver variable have the value 0 when the object in the respective image is not marked as a leaver, and the value 1 when the object in the respective image is marked as a leaver. The number of transfer objects is determined in the exemplary embodiment shown here as described before and is therefore not explained in greater detail.

In the first of the sequence of images, in which the object is indentified for the first time and adopts the starting position 50a in the first sub-region 8 of the observed region 5, the value 51a of the memory state, the value 52a of the entrant variable, and the value 53 of the leaver variable are each initialised with the value 0. The object, which has not yet passed the boundary 10 in the first image, is therefore marked in the first image neither as an entrant nor as a leaver. An entrant number not specified separately here, which is equal to a number of objects marked as entrants, is therefore likewise 0 in the first image. A leaver number, which is not specified separately here and is equal to a number of objects marked as leavers, is also 0 in the first image. Since, in the sequence of images in FIG. 6, only one object is in each case identified and marked as an entrant and/or as a leaver, the entrant number in the sequence of images is equal to the respective value of the entrant variable, and the leaver number is equal to the respective value of the leaver variable. The updating of the entrant number and the leaver number will therefore not be discussed in greater detail hereinafter. From image to image, the object moves to and fro between the first sub-region 8 and the second sub-region 9 via the boundary 10. The number of transfer objects, not shown here, is also 0 in the first image.

In the second image, the second position 50b of the object is located in the second sub-region 9. The value 51b of the memory state is incremented by 1 and now has the value 1. Since the value 51b of the memory state in the second image is even, the memory state of the object in the second image is a first memory state. Once the memory state has been updated, the values 52b of the entrant variable and 53b of the leaver variable are updated. Since the starting position of the object is located in the first sub-region 8 and the object has already passed the boundary 10 once in the second image, as can be deduced from the value 51b of the memory state, the value 52b of the entrant variable is set to 1. The object is therefore marked as an entrant. Since neither the starting position 50a is located in the second sub-region nor is the memory state of the object a second memory state, the value 53b of the leaver variable in the second image is still 0. The object is therefore not marked as a leaver in the second image. The number of transfer objects is 1 in the second image and is therefore equal to the entrant number.

In the third image, the third position 50c of the object is again located in the first sub-region 8. The object has thus again passed the boundary 10 between the second and the third image. The value 51c of the memory state is therefore incremented by 1 and now has the value 2. Since the value 51c is even, the memory state of the object in the third image is the second memory state. Once the memory state has been updated, the value 52c of the entrant variable and the value 53c of the leaver variable are updated. Since the object has passed the boundary 10 at least once, specifically exactly twice, in the third image and the memory state is the second memory state, the value 52c of the entrant variable and the value 53c of the leaver variable are each 1. The object is thus marked in the third image both as an entrant and as a leaver. Since the object in the third image is a re-entrant, the number of transfer objects in the third image is 0 and is therefore different from the entrant number, which is 1.

The fourth position 50d in the fourth image is again located in the second sub-region 9. The object has therefore passed the boundary 10 again between the third and the fourth image. The value 51d of the memory state is increased by 1 to 3, such that the memory state in the fourth image is the first memory state. The value 52d of the entrant variable is still 1 in the fourth image, and the value 53d of the leaver variable is again set to 0 in the fourth image. In the fourth image, the number of transfer objects is again 1 and is therefore equal to the entrant number.

The fifth position 50e in the fifth image is located in the first sub-region 8. The object has therefore again passed the boundary 10 between the fourth and fifth image. The value 51e of the memory state is increased by 1 to 4, and therefore the memory state in the fifth image is the second memory state. The value 52e of the entrant variable is still 1 in the fifth image, and the value 53e of the leaver variable is again set to 1 in the fifth image since the object has passed the boundary at least once, specifically exactly four times, in the fifth image and the memory state is the second memory state. In the fifth image, the object is again a re-entrant. The number of transfer objects is therefore again 0 and is different from the entrant number, which is still 1.

What is claimed is:

1. A method for determining a number of transfer objects which move from a first predetermined sub-region of an observed region into a second predetermined sub-region of the observed region, the method comprising
   recording, using at least one sensor arrangement, a sequence of images of the observed region, and
   using a programmable computation unit connected to the at least one sensor arrangement to conduct the steps of
   identifying objects in the images,
   determining positions of the objects,
   associating each of the objects, in accordance with their positions, either to the first predetermined sub-region or to the second predetermined sub-region, and
   taking into account multiple transfers of the same object between the first predetermined sub-region and the second predetermined sub-region when determining the number of transfer objects, wherein the transfer objects include objects that are associated in a first of the sequence of images with the first predetermined sub-region and which, at the end of the sequence of images or immediately before they leave the observed region, are associated with the second predetermined sub-region, and wherein the transfer objects include objects which, in the sequence of images, enter the observed region from outside the observed re and which, in the observed region, are at first associated with the first predetermined sub-region and which, at the end of the sequence of images or immediately before they leave the observed region, are associated with the second predetermined sub-region.

2. The method according to claim 1, wherein identifying the objects in the images in each case comprises a segmentation of the images.

3. The method according to claim 1, wherein the programmable computation unit is further used to conduct the step of associating a track with each of the objects, wherein the track is determined from positions of the object in the sequence of images, the track having a starting position located either in the first predetermined sub-region or in the second predetermined sub-region.

4. The method according to claim 3, wherein the programmable computation unit is further used to conduct the step of associating a memory state with each of the objects on the basis of its track, wherein, given a starting position of the track, the memory state is dependent on whether the respective object is associated with the first sub-region or the second sub-region, wherein the memory state is a number p initialized with a starting value $p_0$ in the event of a first identification of the object, wherein, when the respective object transfers between the first predetermined sub-region and the second predetermined sub-region, the number p is incremented by a non-zero first value $\Delta p$, wherein a first memory state is present if the cumulative increment $p-p_0$ is an odd multiple of the non-zero first value $\Delta p$, and wherein a second memory state is present if the cumulative increment p-p$_0$ an even multiple of the non-zero first value Δp.

5. The method according to claim 4, wherein the determination of the number of transfer objects comprises updating the number of transfer objects once the objects have transferred between the first predetermined sub-region and the second predetermined sub-region, wherein the updating is performed in accordance with the memory state of the respective object and in accordance with a direction of the transfer of the respective object.

6. The method according to claim 4, wherein the memory state is the first memory state when the starting position of the track of the respective object and the current position of the respective object are each located in different predetermined sub-regions, and wherein the memory state is the second memory state when the starting position of the respective object and the current position of the respective object are located in the same sub-region.

7. The method according to claim 5, wherein the updating process comprises the fact that the number of transfer objects is incremented by a second value when the respective object transfers from the first predetermined sub-region into the second predetermined sub-region and the memory state of the respective object is the first memory state, and in that the number of transfer objects is decremented by the second value when the respective object transfers from the second sub-region into the first sub-region and the memory state of the respective object is the second memory state.

8. The method according to claim 6, wherein the programmable computation unit is further used to conduct the step of marking an object which passes at least once from the first predetermined sub-region into the second sub-region or which passes at least once from the second predetermined sub-region into the first sub-region as at least one of an entrant and a leaver, wherein the object
is marked as an entrant if its starting position is located in the first predetermined sub-region,
is marked as a leaver if its starting position is located in the second predetermined sub-region, and
is marked as an entrant and as a leaver if the memory state of the object is the second memory state.

9. A system for determining a number of transfer objects which move from a first predetermined sub-region of an observed region into a second predetermined sub-region of the observed region, said system comprising at least one sensor arrangement and a computation unit connected to the sensor arrangement, wherein the sensor arrangement is designed to record a sequence of images of the observed region, and wherein the computation unit is programmed
to identify objects in the images and to determine positions of the objects,
to associate the objects, in accordance with their positions, either with the first predetermined sub-region or with the second predetermined sub-region, and
to take into account multiple transfers of the same object between the first predetermined sub-region and the second predetermined sub-region when determining the number of transfer objects, wherein transfer the objects include objects that are associated in a first of the sequence of images with the first predetermined sub-region and which, at the end of the sequence of images or immediately before they leave the observed region, are associated with the second predetermined sub-region, and wherein the transfer objects include objects which, in the sequence of images, enter the observed region from outside the observed region and which, in the observed region, are at first associated with the first predetermined sub-region and which, at the end of the sequence of images or immediately before they leave the observed region, are associated with the second predetermined sub-region.

10. The system according to claim 9, wherein the sensor arrangement comprises an optical sensor selected from the group consisting of a photo camera, a CCD camera, a stereo camera, a video camera, a streak camera and a time-of flight camera.

* * * * *

UNITED STATES PATENT AND TRADEMARK OFFICE
CERTIFICATE OF CORRECTION

PATENT NO. : 9,589,356 B2  Page 1 of 1
APPLICATION NO. : 14/971257
DATED : March 7, 2017
INVENTOR(S) : Marko Stefanovic It is certified that error appears in the above-identified patent and that said Letters Patent is hereby corrected as shown below:

Claim 1, Column 12, Line 38, replace the term "re" with the term "region"

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*